(12) United States Patent
Albrecht et al.

(10) Patent No.: US 6,650,498 B1
(45) Date of Patent: Nov. 18, 2003

(54) ACTUATOR RETRACT CIRCUIT FOR DUAL SPEED HARD DISK DRIVE

(75) Inventors: Thomas Robert Albrecht, San Jose, CA (US); Satoshi Yamamoto, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 579 days.

(21) Appl. No.: 09/660,554

(22) Filed: Sep. 12, 2000

(51) Int. Cl.$^7$ ............................................... G11B 21/02
(52) U.S. Cl. ....................................................... 360/75
(58) Field of Search ............................... 360/75, 73.01, 360/73.06, 78.06; 318/434, 254

(56) References Cited

U.S. PATENT DOCUMENTS

| | | | |
|---|---|---|---|
| 5,486,957 A | | 1/1996 | Albrecht ....................... 360/75 |
| 5,600,217 A | * | 2/1997 | Bartlett ........................ 318/434 |
| 5,633,568 A | * | 5/1997 | Dunfield ....................... 318/254 |
| 6,016,234 A | * | 1/2000 | Blank et al. ................... 360/75 |
| 6,025,968 A1 | * | 5/2002 | Kawachi et al. ............... 360/75 |
| 6,396,652 B1 | * | 5/2002 | Kawachi et al. ............... 360/75 |

* cited by examiner

Primary Examiner—David Hudspeth
Assistant Examiner—Fred F. Tzeng
(74) Attorney, Agent, or Firm—Lumen Intellectual Property Services, Inc.

(57) ABSTRACT

A dual speed hard drive system with an actuator retract system capable of retracting the actuator at approximately the same speed and power in both speed modes. In one embodiment, the control of resistance is used to control the amount of back-emf current supplied to the voice coil motor. In another embodiment, the circuit selectively restrict which spindle motor winding is allowed to supply back-emf current to the voice coil motor. In yet another embodiment, a voltage or a current regulator is used to control the current flowing into the voice coil motor. In all three embodiments, the amount of back-emf current supplied to the voice coil motor is proportional to the power and speed at which the actuator is being retracted.

44 Claims, 18 Drawing Sheets

| Component | Value |
|---|---|
| R1 | 0 |
| R2 | 0 |
| R3 | 10K |
| R4 | 1k |
| R5 | 1k |
| Resistor 134 | 0 |
| Capacitor 106 | 0.68uF |
| D1 | ISS362 (Toshiba) |
| D2 | ISS362 (Toshiba) |
| Transistor 108 | SSM3K01F(Toshiba) |
| Transistor 110 | SSM3K01F(Toshiba) |
| Transistor 118 | 2SC3327(Toshiba) |
| Transistor 120 | 2SC3327(Toshiba) |
| Transistor 112 | 2SC3327(Toshiba) |
| Transistor 124 | 2SB779(Panasonic) |
| Transistor 126 | 2SB779(Panasonic) |
| Transistor 128 | 2SB779(Panasonic) |
| Transistor 104 | UN9214(Panasonic) |
| Retract Current-Low Speed | 170mA |
| Retract Current-High Speed | 320mA |

Fig. 15

| Component | Value |
|---|---|
| R1 | 0 |
| R2 | 0 |
| R3 | 10K |
| R4 | 1k |
| R5 | 1k |
| Resistor 302 | 5 |
| Resistor 304 | 0 |
| Resistor 306 | Open |
| Capacitor 106 | 0.68uF |
| Capacitor 308 | 0.33uF |
| D1 | ISS362 (Toshiba) |
| D2 | ISS362 (Toshiba) |
| D3 | ISS362 (Toshiba) |
| Transistor 108 | SSM3K01F(Toshiba) |
| Transistor 110 | SSM3K01F(Toshiba) |
| Transistor 300 | SSM3K01F(Toshiba) |
| Transistor 118 | 2SC3327(Toshiba) |
| Transistor 120 | 2SC3327(Toshiba) |
| Transistor 112 | 2SC3327(Toshiba) |
| Transistor 124 | 2SB779(Panasonic) |
| Transistor 126 | 2SB779(Panasonic) |
| Transistor 128 | 2SB779(Panasonic) |
| Transistor 104 | UN9214(Panasonic) |
| Retract Current-Low Speed | 140mA |
| Retract Current-High Speed | 160mA |

Fig. 16

| Component | Value |
|---|---|
| R1 | 0 |
| R2 | 0 |
| R3 | 10K |
| R4 | 1k |
| R5 | 1k |
| R6 | 10K |
| R7 | 0 |
| R8 | Open |
| Capacitor 106 | 0.68uF |
| Capacitor 612 | 0.68uF |
| D1 | ISS362 (Toshiba) |
| D2 | ISS362 (Toshiba) |
| D3 | ISS362 (Toshiba) |
| Transistor 108 | SSM3K01F(Toshiba) |
| Transistor 110 | SSM3K01F(Toshiba) |
| Transistor 604 | SSM3K01F(Toshiba) |
| Transistor 118 | 2SC3327(Toshiba) |
| Transistor 120 | 2SC3327(Toshiba) |
| Transistor 112 | 2SC3327(Toshiba) |
| Transistor 124 | 2SB779(Panasonic) |
| Transistor 126 | 2SB779(Panasonic) |
| Transistor 128 | 2SB779(Panasonic) |
| Transistor 104 | UN9214(Panasonic) |
| Transistor 602 | UN9214(Panasonic) |
| Retract Current—Low Speed | 160mA |
| Retract Current—High Speed | 160mA |

Fig. 17

| Component | Value |
|---|---|
| R1 | 0 |
| R2 | 0 |
| R3 | 10K |
| R4 | 0 |
| R5 | 1k |
| R6 | 1k |
| R7 | 10K |
| R8 | Open |
| R9 | 10K |
| R10 | Open |
| Capacitor 106 | 0.68uF |
| Capacitor 612 | 0.68uF |
| Capacitor 904 | 0.68uF |
| D1 | ISS362 (Toshiba) |
| D2 | ISS362 (Toshiba) |
| D3 | ISS362 (Toshiba) |
| D4 | ISS362 (Toshiba) |
| Transistor 108 | SSM3K01F(Toshiba) |
| Transistor 110 | SSM3K01F(Toshiba) |
| Transistor 604 | SSM3K01F(Toshiba) |
| Transistor 118 | 2SC3327(Toshiba) |
| Transistor 120 | 2SC3327(Toshiba) |
| Transistor 112 | 2SC3327(Toshiba) |
| Transistor 124 | 2SB779(Panasonic) |
| Transistor 126 | 2SB779(Panasonic) |
| Transistor 128 | 2SB779(Panasonic) |
| Transistor 104 | UN9214(Panasonic) |
| Transistor 602 | UN9214(Panasonic) |
| Transistor 900 | UN9214(Panasonic) |
| Retract Current-Low Speed | 160mA |
| Retract Current-Mid Speed | 240mA |
| Retract Current-High Speed | 160mA |

Fig.18

| Component | Value |
|---|---|
| Rectifier Circuit | Same as Fig. 17 |
| R1 | 1M |
| R2 | 1M |
| Resistance of VCM | 5 |
| Capacitor 1306 | 0.22uF |
| D1 | 1N5817(General Semiconductor) |
| Transistor 1308 | SSM3K01F(Toshiba) |
| Retract Current-Low Speed | 160mA |
| Retract Current-High Speed | 170mA |

Fig. 19

ACTUATOR RETRACT CIRCUIT FOR DUAL SPEED HARD DISK DRIVE

FIELD OF THE INVENTION

The present invention relates to the actuator retract systems in hard disk drives and more particularly to the actuator retract systems in hard disk drives with dual mode spindle motor control.

DESCRIPTION OF THE RELATED ART

Portable computing devices, particularly notebook computers, are gaining popularity in recent years due to their compact size, weight, and mobility. Notebook computers can operate either from AC power or from battery power. However, unlike AC power, battery power will get depleted as the notebook is being operated. The hard disk drive (HDD) is one of the devices in a notebook that uses large amounts of power when in operation. Therefore, the spindle motors in hard disk drives are intentionally operated at low speeds, measured in revolutions per minute (RPM), to minimize power consumption during battery operation. The trade-off for this lower power consumption is a decrease in RPM of the spindle motor which directly leads to a decreased performance in data access time.

When AC power is in use, power consumption is less of a concern as AC power is practically unlimited. High performance becomes more important in a hard disk drive than low power consumption. In this situation, it is desirable to have the spindle motor in the hard disk drive spin at a significantly higher RPM to allow faster data retrieval.

Virtually all hard disk drives use an actuator retract system to park the actuator in a particular position when the spindle is stopped. In contact-start-stop (CSS) drives, the actuator is parked at the ID of the disk to minimize spindle starting torque for subsequent spin-ups, and to confine head-disk contact during start-stop to a dedicated start-stop zone. In load-unload (L/UL) drives, the actuator is parked with the heads on a ramp (off the disk) to eliminate head-disk contact due to start-stop. In both cases, it is essential that the actuator is always in the proper park position when the spindle is stopped; otherwise the drive may not start reliably on subsequent spin-ups. Furthermore, in the event of sudden removal of power from the hard disk drive, the retract system must successfully park the actuator without use of external power to the drive. The system which retracts the heads in the event of loss of power is referred to as the "power-off retract system".

Power-off retract systems generally rely on extraction of energy from the rotating spindle to provide torque to park the actuator in the absence of external power. Electrical current is derived by rectifying the 3-phase AC voltage produced by the back-emf of the rotating spindle, which functions as a generator while it coasts to a stop. Among the prior art for power-off retract systems are single phase diode rectifiers, which are often used with CSS drives because of their relatively low retract current requirements, and full-wave diode, bipolar transistor, or FET rectifiers for L/UL drives, which require more retract torque and current to park the heads on the ramp structure. Examples of bipolar transistor power-off retract circuits are described in U.S. Pat. No. 5,486,957. FET rectifiers are active rectifiers, which have potentially the highest efficiency, but are significantly more complex.

Although dual speed drives are not yet on the market, they represent an attractive option for future 2.5" hard disk drives in laptop computers. Since laptops are increasingly being used in desktop and other AC-powered environments, in addition to portable battery-powered environments, provision for high performance when on AC power is becoming more important. Furthermore, the recent trend toward providing power in airplanes seats means that laptops will see more and more use in powered conditions, and less on batteries.

Power-off retract systems for dual speed drives have unique requirements, since the drive may be running in either mode (high or low RPM) at the moment of power off. In both cases, the applied retract torque should be approximately the same. Retract systems are designed to provide a specific current to the actuator; this current must be high enough to successfully park the actuator under all expected conditions (temperature, humidity, age, etc. and for the full range of manufacturing tolerances (torque constant of spindle and actuator, resistance of spindle and actuator, ramp friction, flex cable tension, etc. but no higher—too much retract current results in excessive shock to the fragile head-gimbal assemblies as they climb the L/UL ramp and the actuator impacts its crash stop. Therefore, the power-off retract system should be regulated to provide a fixed output regardless of input, or switched to take into account which RPM the spindle is running at the moment of power-off.

A need therefore exists for providing a power-off retract system that provides the desired retract current for both low and high RPM conditions at the moment of power-off.

SUMMARY OF THE INVENTION

A principle objective of the present invention is to provide a power-off retract system that provides the desired retract current for both low and high RPM conditions at the moment of power-off.

In one embodiment, the resistance of one part of the retract circuit is controlled to control the back-emf current flowing into a voice coil motor. A signal from the Main Processor Unit controls the increase or decrease in the resistance of the circuit.

In another embodiment, the circuit utilizes the 3 phases of the motor windings. The spindle motor generates back-emf from the 3 windings and therefore the back-emf is generated in 3 phases. The circuit can selectively restrict which winding is allowed to supply back-emf current to the voice coil motor. In the 1-phase configuration, only one of the spindle motor windings is supplying back-emf current to the voice coil motor and therefore the retract power is the weakest in this configuration. In the 3-phase configuration, all three windings are supplying back-emf current to the voice coil motor and therefore the retract power is the strongest in this configuration. The 1-phase configuration is used in the high speed mode when the back-emf generated by the spindle motor is the highest. The 3-phase configuration is used in the low speed mode when the back-emf generated by the spindle motor is the smallest.

In yet another embodiment, a voltage or a current regulator is used to control the current flowing into the voice coil motor. In the voltage regulator, an operational amplifier is used to compare the voltage from the rectifier circuit to a reference voltage. A transistor is used to stopped the current from flowing into the voice coil motor if the voltage from the rectifier circuit is larger than the reference voltage.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which:

FIG. 15 is a table listing components used in a specific implementation of the conventional retract circuit illustrated in FIG. 1.

FIG. 16 is a table listing components used in a specific implementation of the resistance-altering embodiment of the present invention illustrated in FIG. 3.

FIG. 17 is a table listing the components used in a specific implementation of the 1–3-phase selection embodiment of the present invention illustrated in FIG. 6.

FIG. 18 is a table listing the components used in a specific implementation of the 1–2–3-phase selection embodiment of the present invention illustrated in FIG. 9.

FIG. 19 is a table listing the components used in a specific implementation of the voltage regulation embodiment of the present invention illustrated in FIG. 13.

DETAILED DESCRIPTION OF THE EMBODIMENTS

Although the invention is described as embodied in a hard disk drive with a spindle motor, the invention also applies to other motor systems and applications requiring dual/multiple speed controls such as CD-ROM drives, DVD drives, floppy disk drives, and even video camcorders for example. Accordingly, the following preferred embodiment of the invention is set forth without any loss of generality to, and without imposing limitations upon, the claimed invention.

Figure 1:
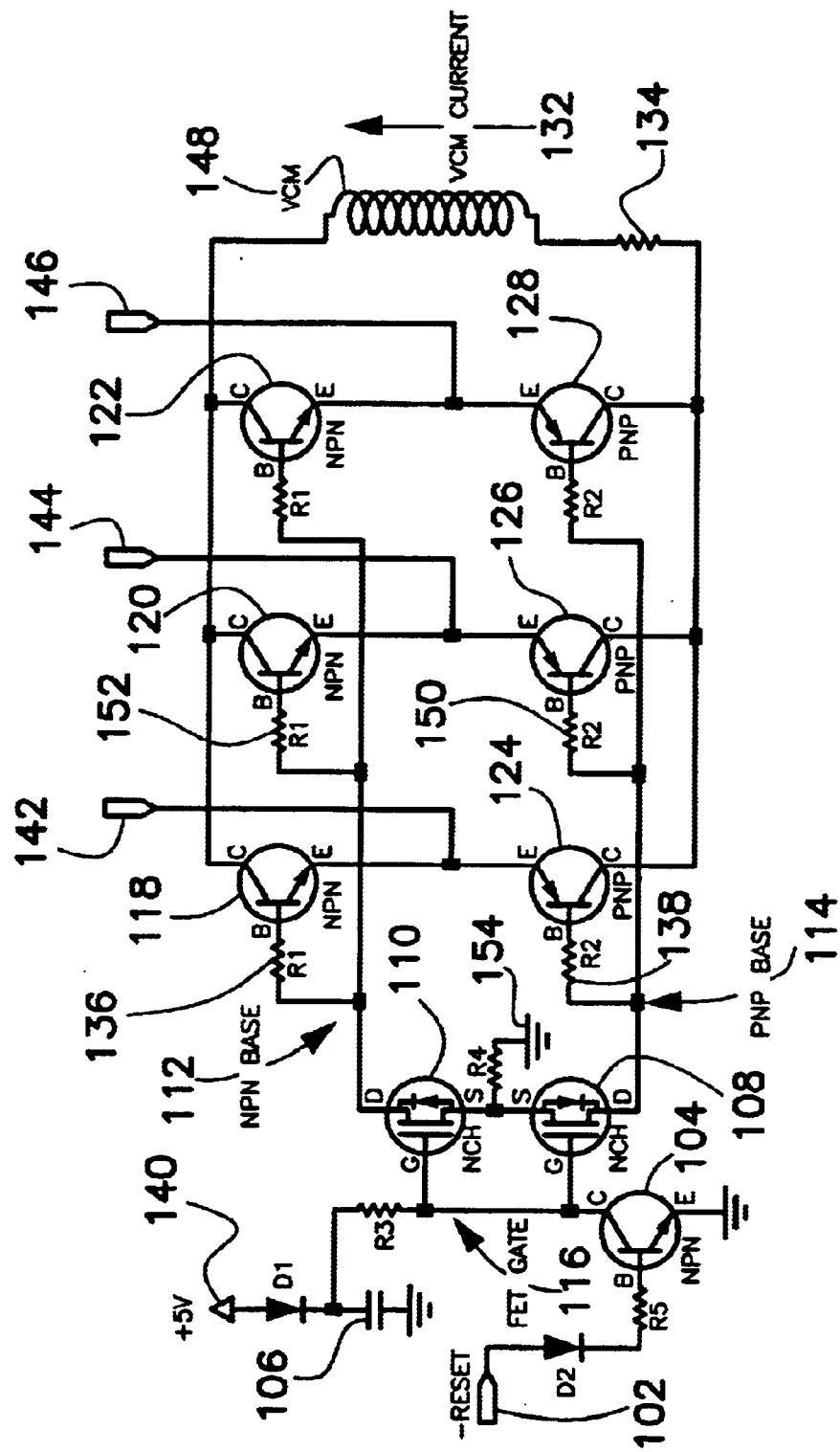
FIG. 1 is a circuit diagram illustrating a conventional retract circuits.

FIG. 1 shows a power-off retract system currently in use in single speed load/unload hard disk drives. This power-off retract system parks the actuator on the ramp in the case of an unexpected power off condition. The circuit uses a full-wave 3-phase rectifier with bipolar transistors to minimize voltage drop.

FIG. 15 is a table listing components used in a specific implementation of the conventional retract circuit illustrated in FIG. 1.

The states of the components in the circuit is summarized in the table below:

| Component | Power ON | Power OFF |
|---|---|---|
| RESET Signal 102 | High | Low |
| Transistor 104 | On | Off |
| Capacitor 106 | Charged | Discharged |
| Transistor 108 | Off | On |
| Transistor 110 | Off | On |
| Transistor 118 | Off | On |
| Transistor 120 | Off | On |
| Transistor 122 | Off | On |
| Transistor 124 | Off | On |
| Transistor 126 | Off | On |
| Transistor 128 | Off | On |

During normal operation of the hard disk drive, the retract circuit is in the Power ON mode. In the Power ON mode, the retract circuit is in the following state:

The Reset Signal 102 is high, supplying a base bias to transistor 104, turn transistor 104 "on" or in the "closed" state. The emitter terminal of transistor 104 is grounded and therefore when transistor 104 is on, the voltage at the FET GATE 116 is zero and all the current flowing from the power source 140 will flow through transistor 104 and into ground. Since there is no voltage at the gates of FET 108 and 110, both FETs are off.

In this state, no current is flowing anywhere in the retract circuit.

When the hard disk drive is powered off, either intentionally or unexpectedly, the following occurs:

The Reset Signal 102 goes low and the power supply 140 goes to zero voltage. With zero voltage at the base, transistor 104 will switch off (open). Although there is no current coming from the power source 140, capacitor 106 is charged during the Power On condition and now will discharge to generate a voltage at the gates of FET 108 and 110. With a voltage at their gates, FET 108 and 110 will turn on, allowing current to flow from the drain terminal to the source terminal.

During the power off condition, the spindle motor is spinning freely, slowly coming to a stop. The back-emf generated by the free spinning 3-phase motor is transported to the retract circuit via terminals 142, 144, and 146. When FET 108 is on, the emitter-base of transistors 118, 120, and 122 forms a conducting path that allows current to flow to ground 154. Similarly when FET 110 is on, the emitter-base of transistors 124, 126, and 128 forms a conducting path that allows current to flow to ground 154. An amount of current coming from the terminals 142, 144, and 146 will flow through the emitter-base of transistors 118, 120, 122, 124, 126, 128. This amount of current is kept small by placing resistors such as 136 and 138 at the base of transistors 118, 120, 122, 124, 126, and 128. However, this current is large enough to generate a voltage to turn on transistors 118, 120, 122, 124, 126, and 128 to allow a flow of current through the emitter-collector junctions of the transistors and into the VCM 148 which parks the actuator.

For example, suppose terminal 142 is outputting the highest current, terminal 144 is outputting a lower current, and terminal 146 is not outputting any current at all. Current from terminal 142 will initially flowing through the emitter-base junction of transistor 124 and into resistor 138. From resistor 138 the current can only flow into FET 108 and into ground 154. This minute amount of current will be large enough to switch on transistor 124 and allow the back-emf from terminal 142 to flow through resistor 134 and into VCM 148. The back-emf supplied to VCM 148 will allow the VCM 148 to park the actuator on the parking ramp (not shown).

At the same time, the current from VCM 148 will flow through the emitter-base junction of transistor 122 and is also kept small by using resistor 152. This minute amount of current will be large enough to turn on transistor 122, allowing the back-emf flowing out of the VCM 148 to flow through the collector-emitter junction of transistor 122 and back into terminal 146, forming the complete circuit.

This systematic on and off switching of transistors 118, 120, 122, 124, 126, and 128 by currents from terminals 142, 144, and 146 allows a constant supply of back-emf to the VCM 148 to park the actuator.

Notice that the on and off states of FET 108 and 110 determines whether current can flow from the emitter-base junctions of transistors 118, 120, 122, 124, 126, and 128 which in turn determines whether current from terminals 142, 144, and 146 can flow through the emitter-collector junctions of these transistors and into the VCM 148.

Figure 2:
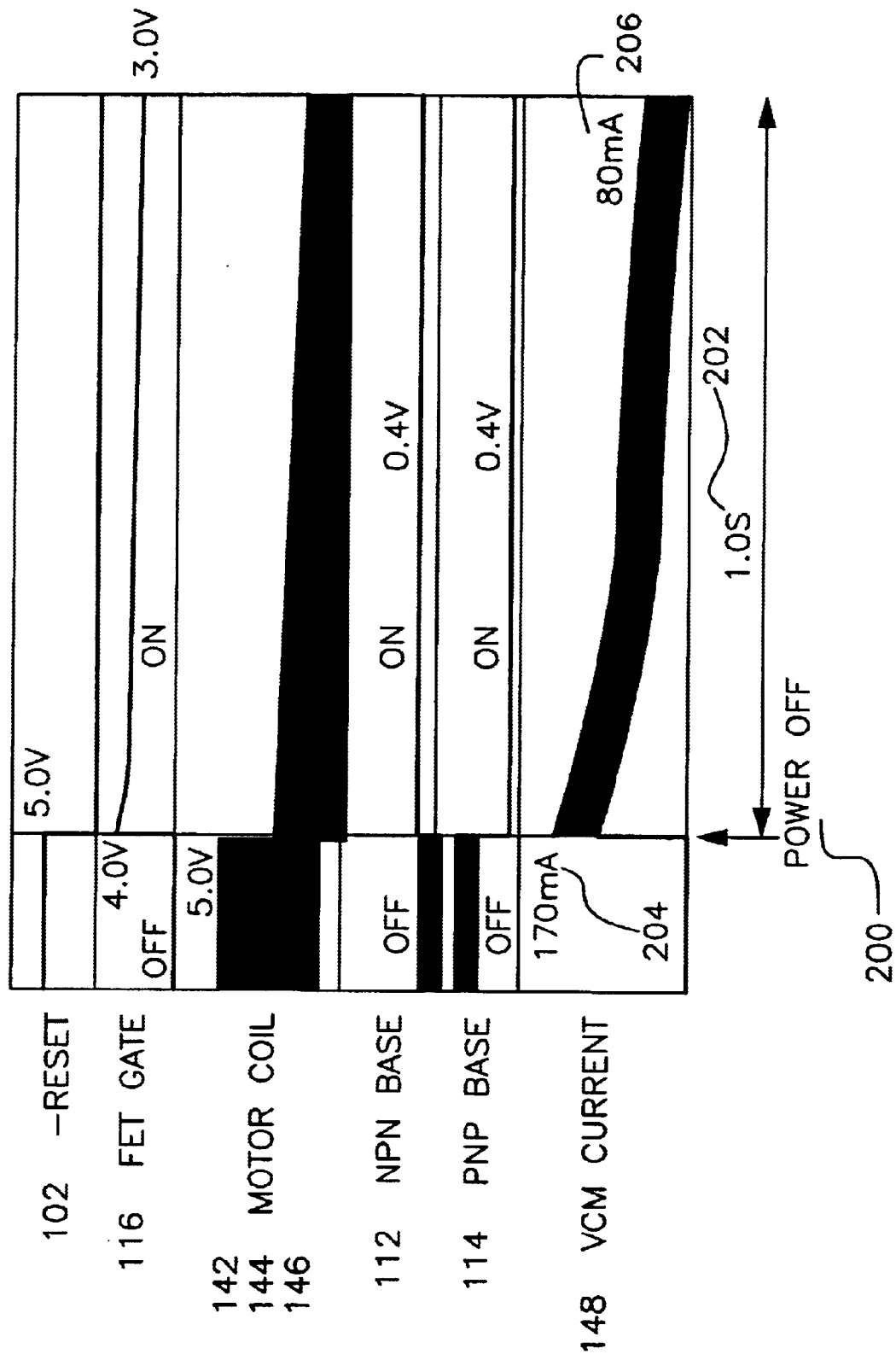
FIG. 2 is a timing diagram of a conventional retract circuit.

FIG. 2 is the timing diagram of the circuit in FIG. 1. The power-off condition occurs at time 200. Note that the timing diagram is presented for 1 second after the power-off condition. The retract circuit only needs to be operational for the duration that is necessary for the actuator to park on the ramp. The 1 second as shown is for illustration purposes only. The necessary duration will depend on the application.

At time 200, the power-off condition occurs and the reset signal 102 goes low (0V). Because reset signal 102 is low, transistor 104 will also switch off. The voltage 140 will now be zero and capacitor 106 will start discharging into the FET gate 116. This is shown in the timing diagram showing there is 4.0V at the FET gate 116 at time 200. Both NPN 112 and PNP 114 bases shows a small voltage of 0.4V which illustrates the current leaking from the emitter-base junction of transistors 118, 120, 122, 124, 126, and 128. This minute amount of current generates a voltage large enough to turn on these transistors and let current flow to the VCM 148. The current generated by the free spinning spindle motor at power off at time 200 is 170 mA and tapers off to 80 mA at the end of 1.0s.

As the 3-phase motor coil rotate through the three phases, the synchronized switching of transistors 118, 120, 122, 124, 126, and 128 will allow the spindle motor, during power-off conditions, to supply back-emf to the VCM 148 to retract and park the actuator on the ramp.

The back-emf generated by the spindle motor at terminals 142, 144, and 146 is dependent on the speed at which the spindle motor is spinning. Therefore, a spindle motor in the high speed mode prior to the power-off condition will be supplying a higher back-emf than a spindle motor in the low speed mode prior to the power-off condition. Since the mode of the spindle motor prior to the power-off condition is unpredictable, the back-emf generated by the spindle motor is also unpredictable. This is a problem for the retract system described in FIG. 1. The retract system can only be designed for one speed mode condition and may not perform as designed in the other speed mode condition because of the different levels of back-emf generated by the spindle motor.

Figure 3:
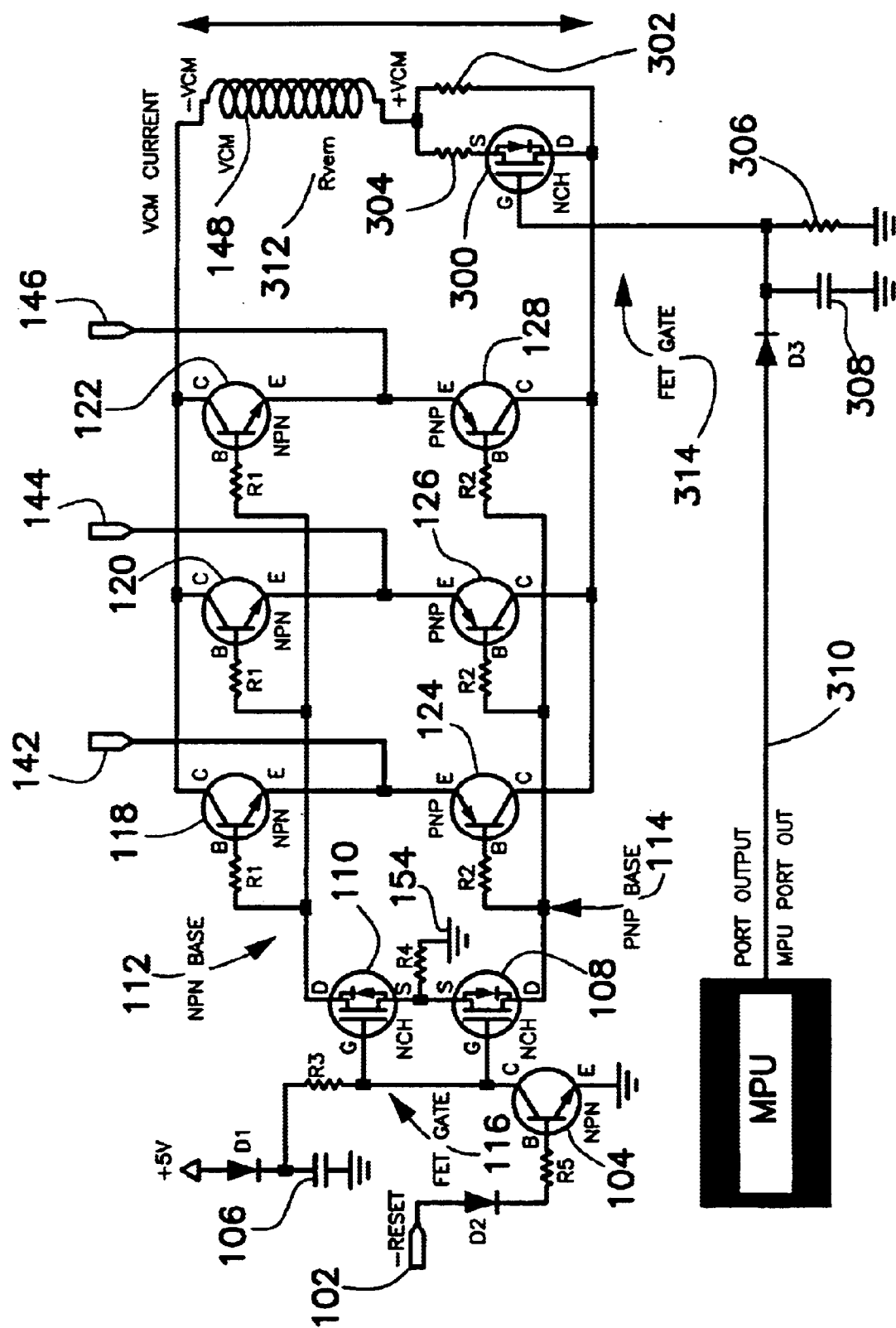
FIG. 3 is a circuit diagram illustrating a resistance-altering embodiment of the present invention.

FIG. 3 illustrates an embodiment of the present invention wherein the retract circuit will function consistently regardless of whether the system is in the low speed mode or the high speed mode. The conventional retract circuit as shown in FIG. 1 is used with a few additions.

FIG. 16 is a table listing components used in a specific implementation of the resistance-altering embodiment of the present invention illustrated in FIG. 3.

In a conventional retract circuit, one resistor 302 is placed in series with the VCM 148. In this configuration, the total resistance is given by:

$$TotalResistance = R_{VCM} + R_{302}$$

In the present invention, a third resistor 304 is added in series with the VCM 148 but in parallel with resistor 302. There is also a transistor 300 that controls whether resistor 304 is in used or not. FET 300 is controlled by a signal from the MPU Port Out 310.

The MPU Port Out signal 310, capacitor 308, and FET 300 has the following states:

| Speed Mode | MPU Port 310 Power On | MPU Port 310 Power Off | Capacitor 308 Power On | Capacitor 308 Power Off | FET 300 Power On | FET 300 Power Off |
| --- | --- | --- | --- | --- | --- | --- |
| High | Low | Low | No Charge | No discharge | Off | Off |
| Low | High | Low | Charge | Discharge | On | On |

During the normal operations, which is also the power on condition, the state of the retract circuit has no effect on the operation of the disk drive. Only during the power off condition are the states of the different components in the retract circuit important.

In the high speed mode, the MPU Port Out signal 310 is low during the power on condition. Since the MPU Port Out signal 310 is low, the capacitor 308 is not charged during the power on condition and FET 300 is also off during this time. When the power off condition occurs, the MPU Port Out signal 310 stays low, and FET 300 also stays off during the power off condition. In effect, resistor 304 has been disabled. The total resistance therefore stays the same as the conventional circuit as:

$$TotalResistance = R_{VCM} + R_{302} \qquad (1)$$

In the low speed mode, the MPU Port Out signal 310 is high during the power on condition. Since the MPU Port Out signal 310 is high, capacitor 308 is charged during the power on condition and FET 300 is also on during this time. When the power off conditions occurs, the MPU Port Out signal 310 changes to low. However, capacitor 308, which is charged up till the moment the power off condition occurs, now begins to discharge, creating a voltage at the base of the FET 300, keeping FET 300 on for designated period of time. This enables resistor 304 and the total resistance changes to as follows:

$$TotalResistance = R_{VCM} + \frac{R_{302}(R_{304} + R_{300})}{R_{304} + R_{302} + R_{300}} \quad (2)$$

wherein $R_{300}$ represents the drain-source ON resistance of the FET 300. A FET with a very small drain-source ON resistance can be chosen and the $R_{300}$ value is negligible. Also, for illustration purposes, assume $R_{304}$ also has 0 ohm resistance. Equation (2) then reduces to:

$$TotalResistance = R_{VCM} \quad (3)$$

Furthermore, if $R_{302}$ was chosen to equal $R_{VCM}$, then the total resistance of the two speed modes are as follows:

High Speed Mode:

$$TotalResistance = 2R_{VCM} \quad (4)$$

Low Speed Mode:

$$TotalResistance = R_{VCM} \quad (5)$$

Therefore, in this configuration, the total resistance in the high speed mode is twice that of the low speed mode. The higher resistance in the high speed mode reduces the current that flows into the VCM 148. This prevents the higher current generated by the spindle motor in the high speed mode from causing the actuator to retract too quickly and slamming into the parking ramp.

By correctly choosing the resistance of resistor 302 and resistor 304, the retract circuit can be designed so that the actuator retracts at approximately the same speed during a power off condition for any two discrete speed modes.

Figure 4:
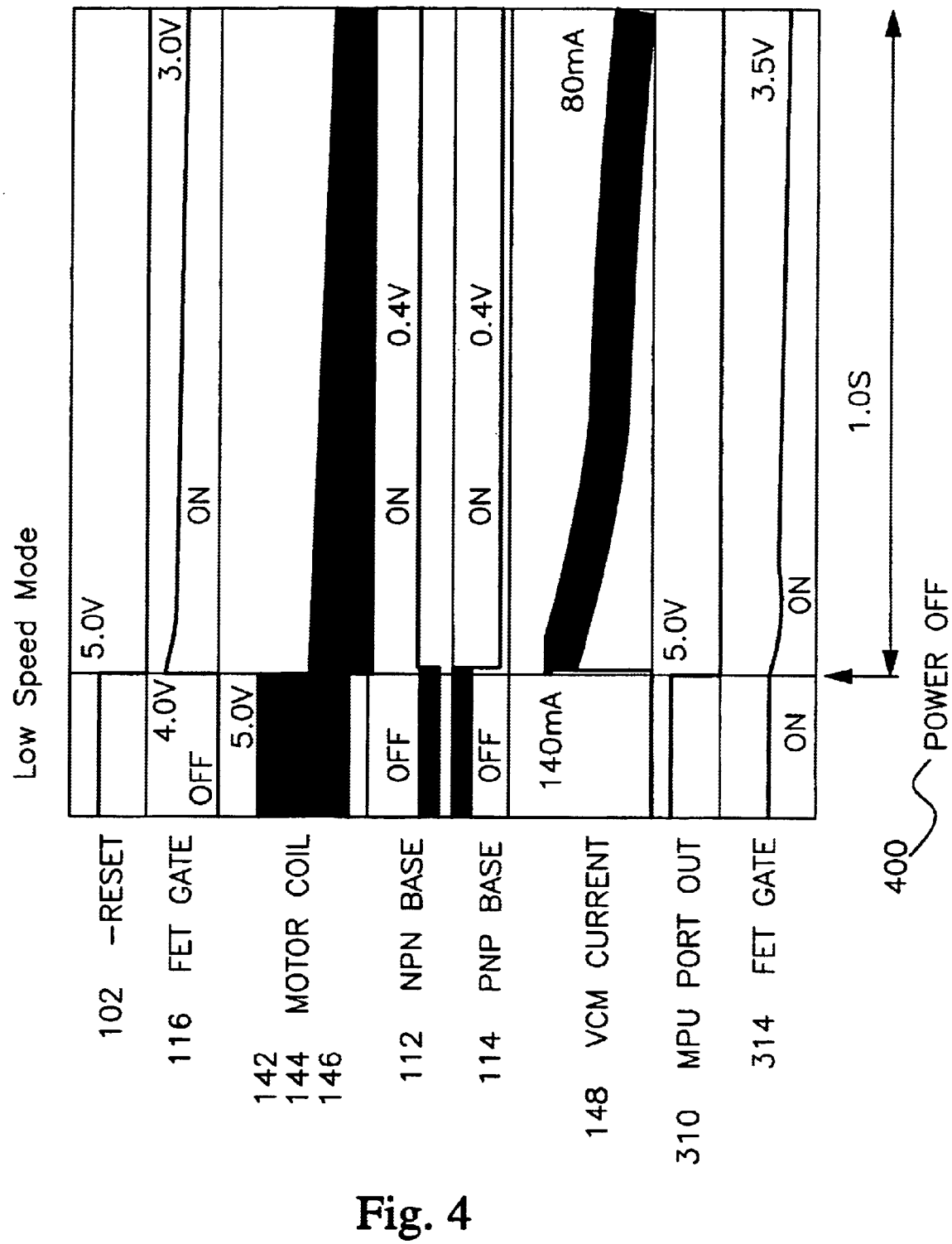
FIG. 4 is a timing diagram of the resistance-altering embodiment of the present invention in a low speed mode.

FIG. 4 is a timing diagram of the above retract circuit in the low speed mode. At time 400, the power off condition occurs. Reset signal 102 goes low. FET gate 116 stays on from the voltage supplied by the discharging capacitor 106. The motor coil voltage of 5.0V drops and continues to drop as the spindle motor freely spins to a stop. Both NPN 112 and PNP 114 bases turns on at time 400 allowing a small current to flow from the emitter-base junctions, generating a voltage of 0.4V at the bases of transistors 118, 120, 122, 124, 126, and 128. The VCM current 148 starts to drop as the motor spins freely to a stop. The MPU Port Out signal 310 changes to low at time 400 and FET Gate 314 and therefore FET 300 stays on from the voltage supplied by capacitor 308.

Figure 5:
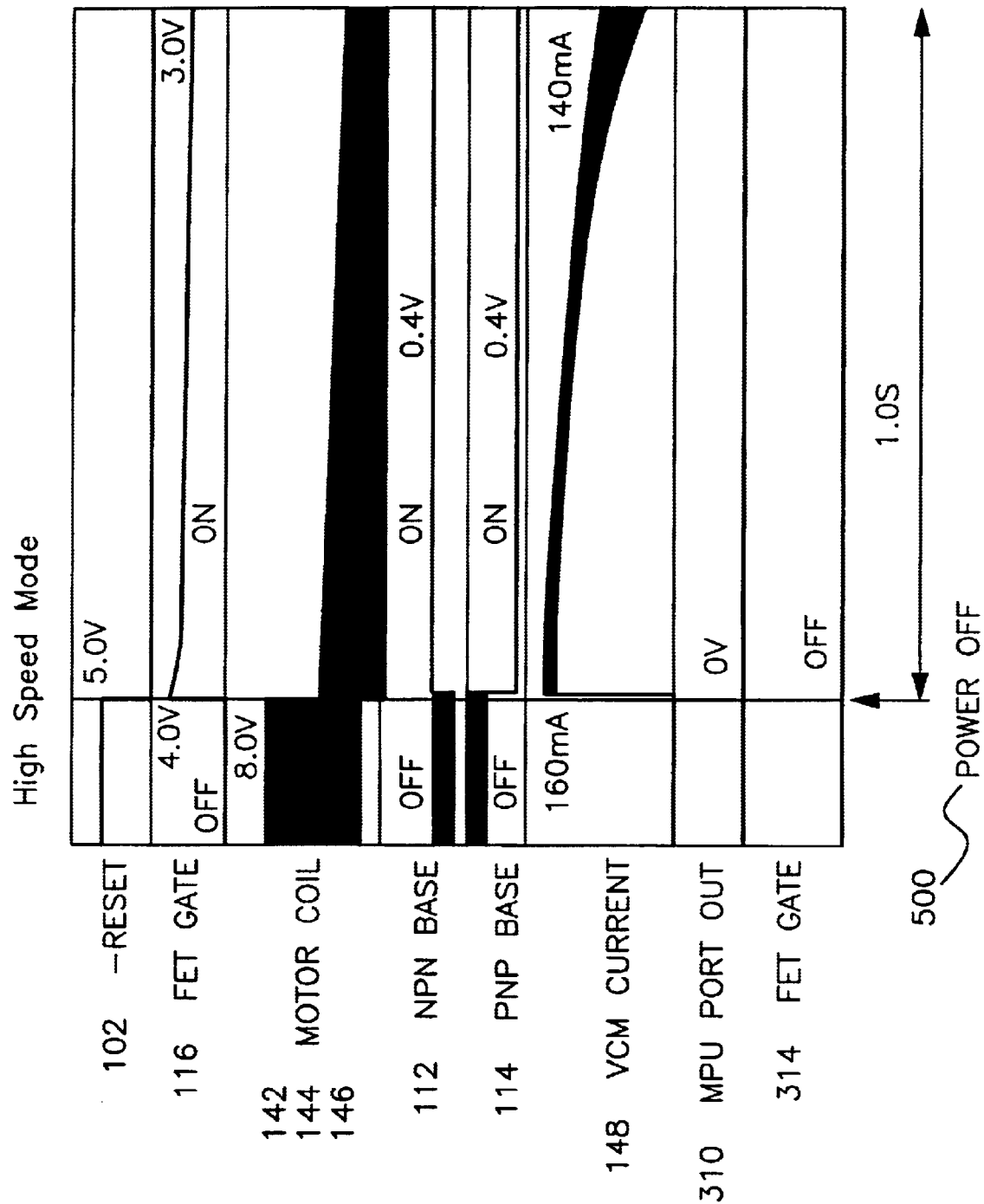
FIG. 5 is a timing diagram of the resistance-altering embodiment of the present invention in a high speed mode.

FIG. 5 is a timing diagram of the above retract circuit in the high speed mode. At time 500, the power off condition occurs. Reset signal 102 goes low. FET gate 116 stays on from the voltage supplied by the discharging capacitor 106. The motor coil voltage of 8.0V drops and continues to drop as the motor freely spins to a stop. Both NPN 112 and PNP 114 bases turns on at time 500 allowing a small current to flow from the emitter-base junctions, generating a voltage of 0.4V at the bases of transistors 118, 120, 122, 124, 126, and 128. The VCM current 148 starts to drop as the motor spins freely to a stop. The MPU Port Out signal 310 stays low at time 400 and FET Gate 314 and therefore FET 300 stays off because capacitor 308 was not charged during the power on condition.

Figure 6:
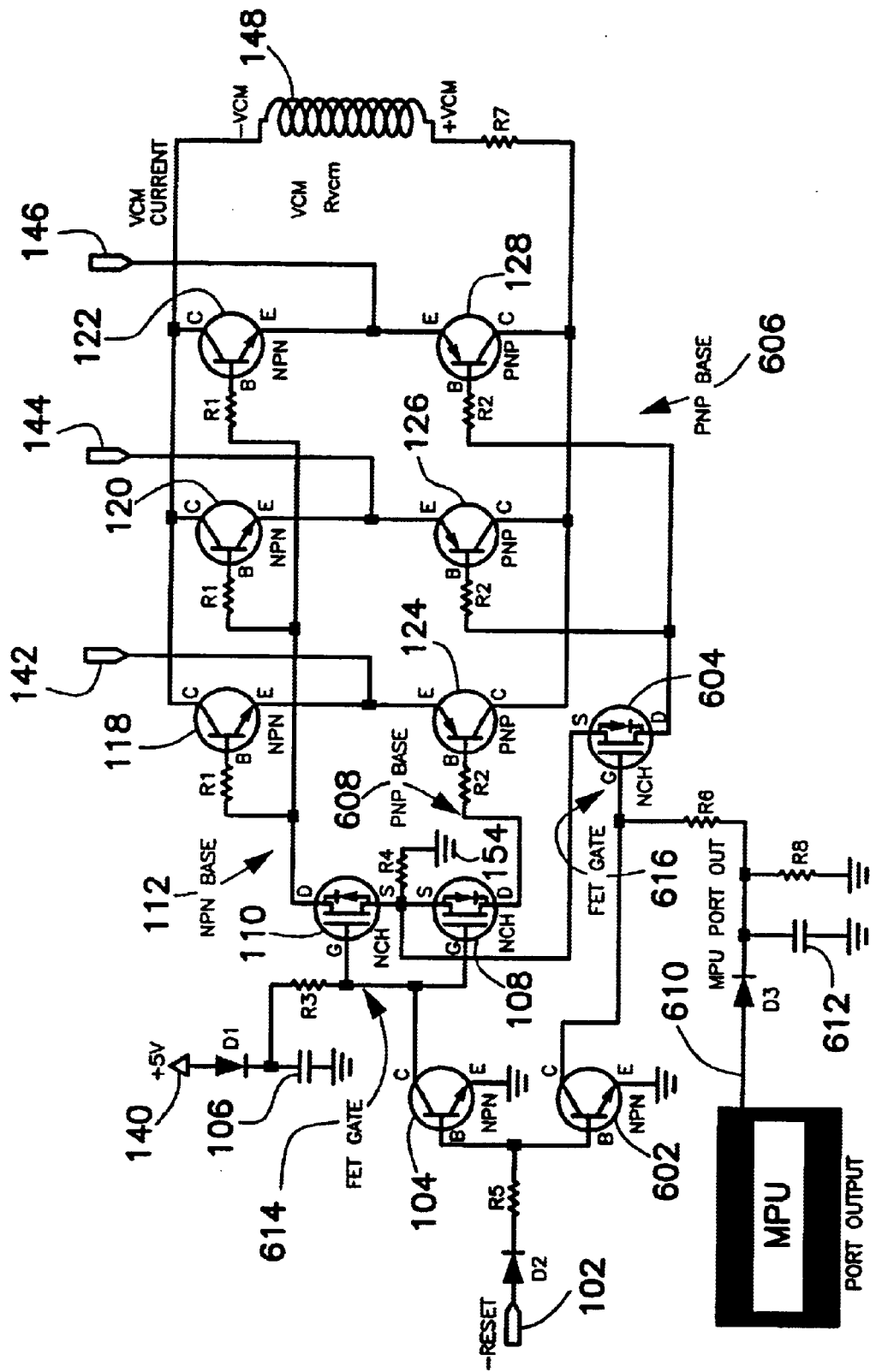
FIG. 6 is a circuit diagram illustrating a 1–3-phase selection embodiment of the present invention.

FIG. 6 is another embodiment of the present invention. Parts of the conventional retract circuit is used with additions that allows for a better control of how transistors 118, 120, 122, 124, 126, and 128 are turned on. The basic principle behind this embodiment is that there are 3 phases of back-emf coming from the three terminals 142, 144, and 146 being supplied to the VCM 148 in this retract circuit. In the conventional retract circuit, back-emf is transported from all three terminals in all 3 phases (full-wave), supplying the VCM with the greatest amount of back-emf possible for the actuator retract operation. By controlling the back-emf from which phase is supplied to the VCM, and therefore how much power the VCM has to retract the actuator, the retract speed can be controlled.

FIG. 17 is a table listing the components used in a specific implementation of the phase selection embodiment of the present invention illustrated in FIG. 6.

The embodiment illustrated in FIG. 6 is for a 1-Phase, 3-Phase configuration. During the low speed mode, the least amount of back-emf is generated by the spindle motor during the power off condition. Therefore, the 3-phase configuration is used to supply back-emf from all 3 phases via terminals 142, 144, and 146 to the VCM 148.

However, during the high speed mode, more than enough back-emf current is generated by the spindle motor during the power off condition. If all this back-emf is supplied to the VCM 148, the actuator may retract too quickly and slam into the parking ramp and get damaged. Therefore, during the high speed mode, the 1-phase configuration is used where back-emf from one of the phases out of the three possible phases is supplied via terminals 142, 144, and 146 to the VCM 148. Although the above example describes supplying the back-emf from terminal 142, those skilled in the art will recognize that any one of the three terminals can be chosen for this purpose.

The component states for low and high speed modes during power on condition and power off condition are as follows:

| Component | Power ON | Power OFF |
|---|---|---|
| Low Speed Mode (3-Phase) | | |
| RESET Signal 102 | High | Low |
| Transistor 104 | On | Off |
| Transistor 602 | On | Off |
| Capacitor 106 | Charged | Discharged |
| FET 108 | Off | On |
| FET 110 | Off | On |
| FET 604 | Off | On |
| Transistor 118 | Off | On/Off |
| Transistor 120 | Off | On/Off |
| Transistor 122 | Off | On/Off |
| Transistor 124 | Off | On/Off |
| Transistor 126 | Off | On/Off |
| Transistor 128 | Off | On/Off |
| Capacitor 612 | Charged | Discharged |
| MPU Out Signal 610 | High | Low |
| High Speed Mode (1-Phase) | | |
| RESET Signal 102 | High | Low |
| Transistor 104 | On | Off |
| Transistor 602 | On | Off |
| Capacitor 106 | Charged | Discharged |
| FET 108 | Off | On |
| FET 110 | Off | On |
| FET 604 | Off | Off |
| Transistor 118 | Off | On/Off |
| Transistor 120 | Off | On/Off |
| Transistor 122 | Off | On/Off |
| Transistor 124 | Off | On/Off |
| Transistor 126 | Off | Off |
| Transistor 128 | Off | Off |
| Capacitor 612 | Not Charged | No Discharge |
| MPU Out Signal 610 | Low | Low |

The method for selectively implementing the 1-phase and the 3-phase configurations is to control which of the transistors 124, 126, and 128 is allowed to conduct back-emf from terminals 142, 144, and 146, respectively, to the VCM 148. In a conventional retract circuit illustrated in FIG. 1, all three transistors 124, 126, and 128 are controlled by FET 108. Therefore, either all three transistors 124, 126, and 128 are on or all three are off. In the present embodiment, transistor 124 is controlled by FET 108 and transistor 126 and 128 are controlled by FET 604. By controlling FET 108 and 604, the 1-phase and the 3-phase configurations can be achieved. When FET 108 is on and FET 604 is off, the retract circuit is in the 1-phase configuration because only transistor 124 is allowed to turn on and both transistors 126 and 128 are off. When both FET 108 and 604 are on, the retract circuit is in the 3-phase configuration and all three transistors 124, 126, and 128 are allowed to turn on and conduct back-emf to the VCM 148. The detailed operations of the circuit is explain below.

The reset signal 102 now controls two transistors 104 and 602. As in the conventional retract circuit, transistor 104 controls FET 108 and 110. FET 108 in turn controls transistor 124. FET 110 controls transistors 118, 120, and 122. Transistor 602 controls FET 604 which in turn controls transistors 126 and 128.

FET 604 is also controlled by a MPU Port Out Signal 610 which has the following states:

| | MPU Port 610 | | Capacitor 612 | | FET 604 | |
|---|---|---|---|---|---|---|
| Speed Mode | Power On | Power Off | Power On | Power Off | Power On | Power Off |
| High | Low | Low | No Charge | No discharge | Off | Off |
| Low | High | Low | Charge | Discharge | Off | On |

Reset signal 102 is high during the power on condition and therefore both transistors 104 and 602 are on during power on. Both transistor's emitters are connected to ground. Therefore, the current flowing in from the power source 140 will flow through transistor 104 and into ground. This prevents FET 108 and 110 from turning on. However, during the power off condition, reset signal 102 will go low and the power source 140 will also go to zero voltage. Transistors 104 and 602 will be switched off and capacitor 106 will start discharging into FET 108 and 110. This turns on FET 108 and 110 and therefore would enable transistors 118, 120, and 122, as well as transistor 124 to turn on (when there is an emitter-base current) and stay on for the duration of the capacitor discharge. With only transistor 124 turned on, the retract circuit is in a 1-phase configuration. The retract circuit will always be in at least the 1-phase configuration when the power off condition occurs and may be in a 3-phase configuration depending on whether the spindle motor was in the high speed mode or not.

If the spindle motor was in the high speed mode, the MPU Port Out signal 610 is low during the power on condition and therefore capacitor 612 was not charged during the power on condition. Subsequently during the power off condition when the MPU Port Out signal 610 is low and transistor 602 is also off, there will be no discharge from the capacitor 612 and therefore FET 604 will stay off. This prevents transistors 126 and 128 from turning on because there is no conducting path between the emitter-base junction of transistors 126 and 128 and the ground 154. That leaves only transistor 124 being able to turn on and hence a 1-phase configuration retract circuit.

Back-emf current from terminal 142 will enter the emitter of transistor 124 and some will leak out to the base, and flow through the drain-source terminals of transistor 108, and into ground 154. This small amount of current will generate a voltage to turn on transistor 124 and the emitter-collector junction will start to conduct. The majority of back-emf current from terminal 142 will now flow into the VCM 148 through transistor 124.

As the spindle motor continue through the $2^{nd}$ and $3^{rd}$ phases, the back-emf current from terminals 144, and 146 will not be able to flow through transistors 126 and 128 respectively because these two transistors are not allowed to turn on.

Transistors 118, 120, and 122 are able to turn on because transistor 110 is on. Therefore transistors 118, 120, and 122 will turn on when there is emitter-base current from the terminals 142, 144, and 146. This allows the back-emf current flowing out of the VCM 148 to return via one of the transistors 118, 120, and 122 and form a complete circuit. The spindle motor continues to spin and produce back-emf current at each of the three phases but only back-emf current from terminal 142 is supplied to the VCM 148 for retracting the actuator.

In the low speed mode, the MPU Port Out signal 610 is high during the power on condition. Capacitor 612 is charged by the MPU Port Out signal 610 during the power on condition. In the power on condition, transistor 602 is on and therefore all the voltage from the MPU Port Out signal 610 flows through transistor 602 into ground. Since there is no voltage at the gate of FET 604, it is off.

At the power off condition, transistor 602 turns off (because reset signal 102 goes low). The MPU Port Out signal 610 also goes low and capacitor 612 will start discharging. The discharge from capacitor 612 will generate a voltage at the gate of FET 604, turning it on. With FET 604 turned on, transistors 126 and 128 are also able to turn on because there is a conducting path between the emitter-base junction of transistors 126 and 128 and the ground 154.

With transistor 124 also able to turn on during the power off condition, the retract circuit is in the 3-phase configuration. All six transistors 118, 120, 122, 124, 126, and 128 are allowed to turn on and off freely in a systematic fashion and back-emf from all three terminals 142, 144, and 146 are supplied to the VCM 148 for retracting the actuator. This provides the maximum back-emf current for the VCM 148 to retract the actuator.

To summarize, one third of the back-emf current generated in the high speed mode is supplied to the VCM 148 to retract the actuator and all the back-emf current generated in the low speed mode is supplied to the VCM 148 to retract the actuator.

Figure 7:
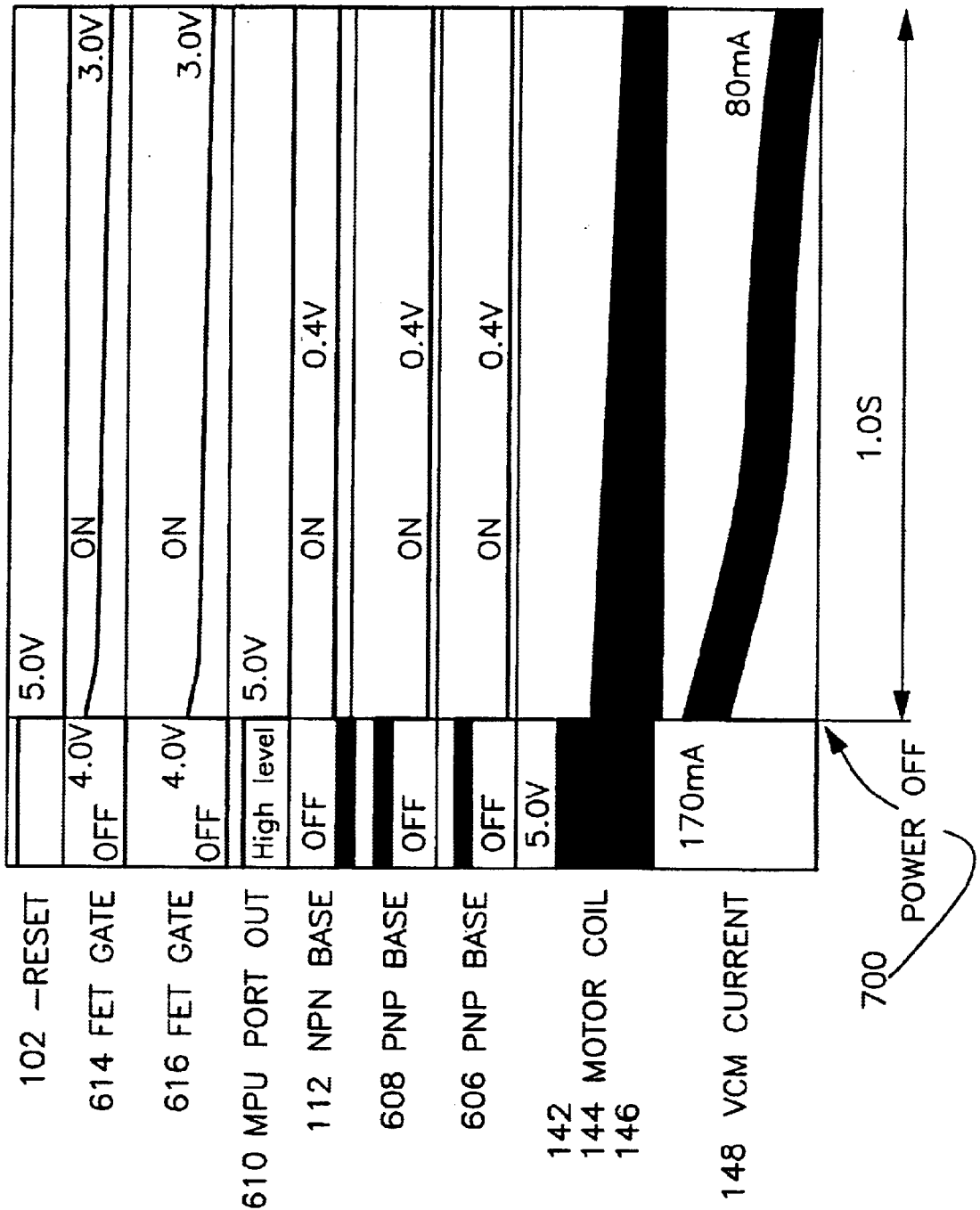
FIG. 7 is a timing diagram of the 1–3-phase selection embodiment of the present invention in a low speed mode.

FIG. 7 is a timing diagram of the above retract circuit in the 3-Phase low speed mode. At time 700, the power off condition occurs. Reset signal 102 goes low. The MPU Port Out signal 610 also goes low and capacitor 612 will start to discharge. At this time, both FET gates 614 and 616 switches on, allowing a current to flow in the emitter-base junctions of transistors 118, 120, 122, 124, 126, and 128, generating voltages of 0.4V at the NPN base 112 and at the PNP bases 608 and 606. The motor coil voltage starts to drop as the spindle motor spins freely to a stop. The VCM current 148 also drops as the spindle motor spins freely to a stop.

Figure 8:
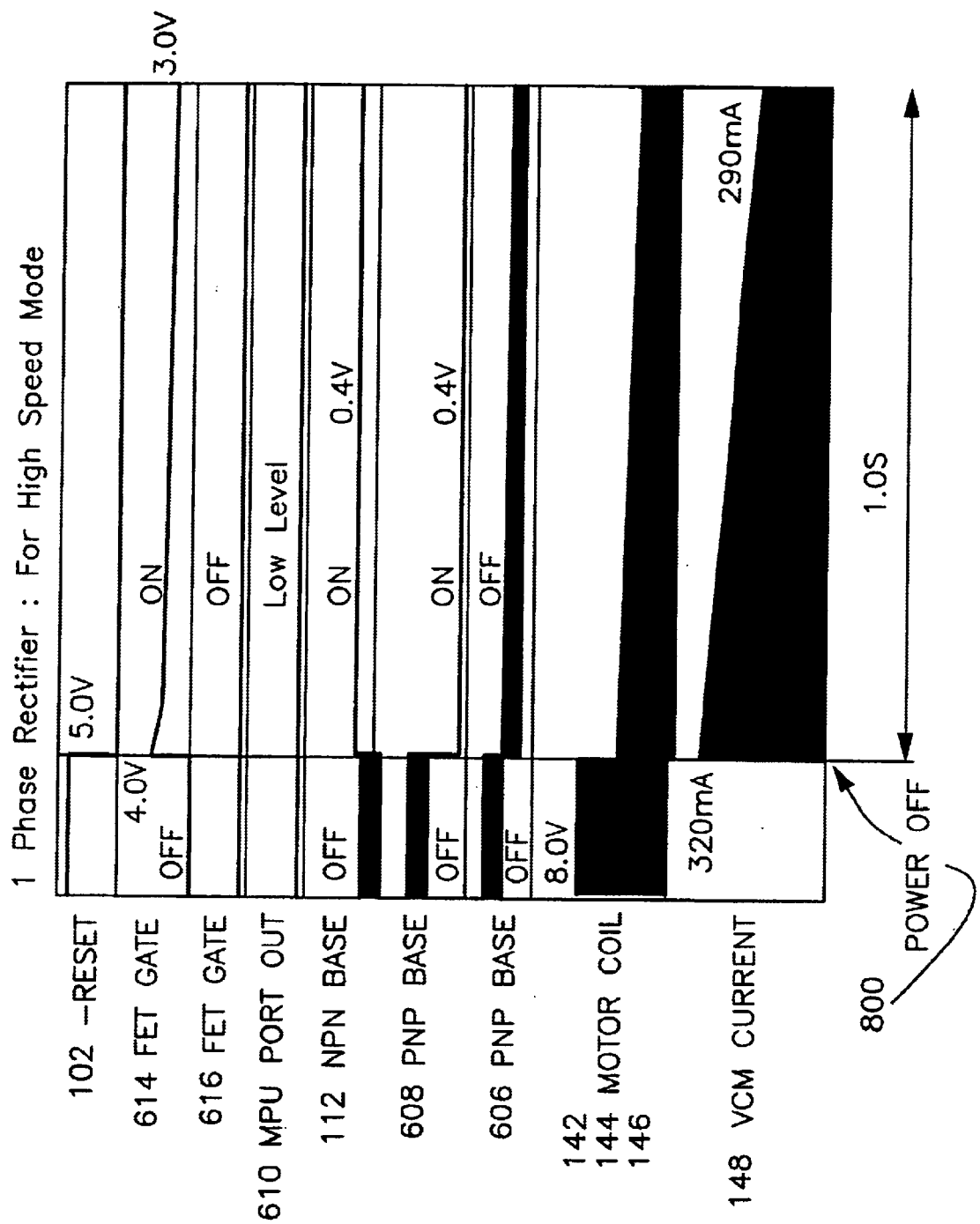
FIG. 8 is a timing diagram of the 1–3-phase selection embodiment of the present invention in a high speed mode.

FIG. 8 is a timing diagram of the above retract circuit in the 1-Phase high speed mode. At time 800, the power off condition occurs. Reset signal 102 goes low. The MPU Port Out signal 610 stays low and capacitor 612 will not discharge since it was not charged during the power on condition. At this time, only FET gate 614 switches on, allowing a current to flow in the emitter-base junctions of transistors 118, 120, 122, and 124, generating voltages of 0.4V at the NPN base 112 and at the PNP base 608. FET gate 616 does not switch on because there is no discharge from capacitor 612. Therefore no current is allowed to flow in the emitter-base junctions of transistors 126 and 128 as illustrated by PNP base 606 having no voltage and these two transistors stays off. The motor coil voltage starts to drop as the motor spins freely to a stop. The VCM current 148 also drops as the motor spins freely to a stop.

Figure 9:
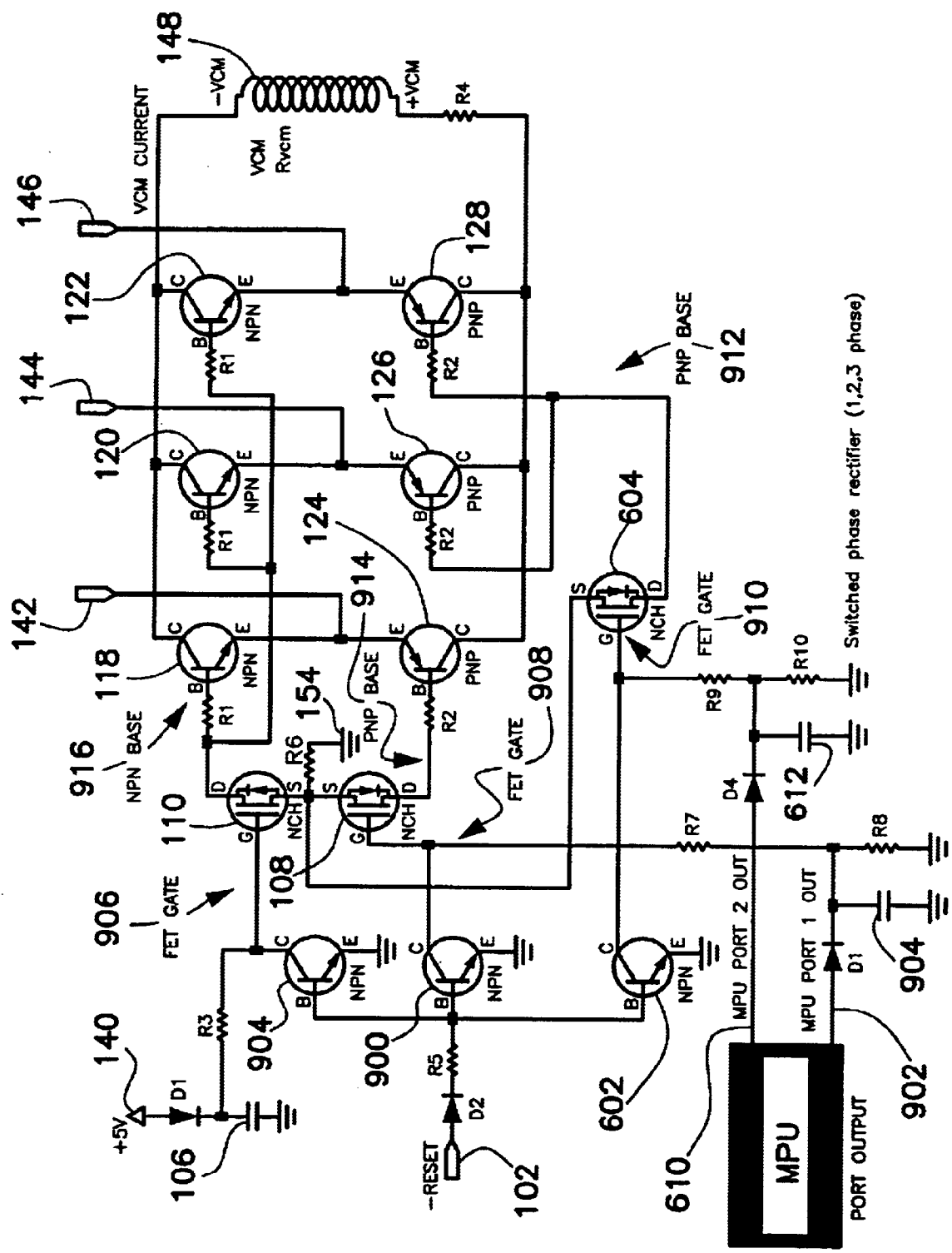
FIG. 9 is a circuit diagram illustrating a 1–2–3-phase selection embodiment of the present invention.

FIG. 9 is an embodiment of the present invention adapted for 3 speed modes. Wherein the embodiment on FIG. 6 has two phase settings (1-Phase and 3-Phase) for two speed modes, this embodiment has three phase settings, 1-Phase, 2-Phase, and 3-Phase for three speed modes. In the embodiment presented in FIG. 6, only 2 transistors 126 and 128 are controlled by the MPU Port Out signal. Transistor 124 is allowed to turn on whenever the power off condition occurs. In the embodiment presented in FIG. 9, all three transistors 124, 126, and 128 are controlled by MPU Port Out signals.

FIG. 18 is a table listing the components used in a specific implementation of the 1–2–3-phase selection embodiment of the present invention illustrated in FIG. 9.

The component states in the three discrete speed modes, which are called low, mid, and high speed modes here forth, are illustrated below:

| Component | Power ON | Power OFF |
|---|---|---|
| Low Speed Mode (3-Phase) | | |
| RESET Signal 102 | High | Low |
| Transistor 104 | On | Off |
| Transistor 602 | On | Off |
| Transistor 900 | On | Off |
| Capacitor 106 | Charged | Discharged |
| FET 108 | Off | On |
| FET 110 | Off | On |
| FET 604 | Off | On |
| Transistor 118 | Off | On/Off |
| Transistor 120 | Off | On/Off |
| Transistor 122 | Off | On/Off |
| Transistor 124 | Off | On/Off |
| Transistor 126 | Off | On/Off |
| Transistor 128 | Off | On/off |
| Capacitor 612 | Charged | Discharged |
| MPU Out Signal 610 | High | Low |
| Capacitor 904 | Charged | Discharged |
| MPU Out Signal 902 | High | Low |
| Mid Speed Mode (2-Phase) | | |
| RESET Signal 102 | High | Low |
| Transistor 104 | On | Off |
| Transistor 602 | On | Off |
| Transistor 900 | On | Off |
| Capacitor 106 | Charged | Discharged |
| FET 108 | Off | Off |
| FET 110 | Off | On |
| FET 604 | Off | On |
| Transistor 118 | Off | On/Off |
| Transistor 120 | Off | On/Off |
| Transistor 122 | Off | On/Off |
| Transistor 124 | Off | Off |
| Transistor 126 | Off | On/Off |
| Transistor 128 | Off | On/Off |
| Capacitor 612 | Charged | Discharge |
| MPU Out Signal 610 | High | Low |
| Capacitor 904 | Not Charged | No discharge |
| MPU Out Signal 902 | Low | Low |
| High Speed Mode (1-Phase) | | |
| RESET Signal 102 | High | Low |
| Transistor 104 | On | Off |
| Transistor 602 | On | Off |
| Capacitor 106 | Charged | Discharged |
| Transistor 900 | On | Off |
| FET 108 | Off | On |
| FET 110 | Off | On |
| FET 604 | Off | Off |
| Transistor 118 | Off | On/Off |
| Transistor 120 | Off | On/Off |
| Transistor 122 | Off | On/Off |
| Transistor 124 | Off | On/Off |
| Transistor 126 | Off | Off |
| Transistor 128 | Off | Off |
| Capacitor 612 | Not Charged | No Discharge |
| MPU Out Signal 610 | Low | Low |
| Capacitor 904 | Charged | Discharge |
| MPU Out Signal 902 | High | Low |

In the 1-Phase configuration, only transistor 124 is able to turn on and supply back-emf from terminal 142 to the VCM 148. In the 2-Phase configuration, transistors 126 and 128 are able to turn on and supply back-emf from terminals 144 and 146 to the VCM 148. In the 3-Phase configuration, transistors 124, 126, and 128 are able to turn on and supply current from all three terminals 142, 144, and 146 to the VCM 148.

The MPU Port Out signals 610 and 902 for the three discrete speed modes during power on condition are as follows:

| | MPU Port Out 610 | MPU Port Out 902 |
|---|---|---|
| Low Speed Mode (3-Phase) | High | High |
| Mid Speed Mode (2-Phase) | High | Low |
| High Speed Mode (1-Phase) | Low | High |

Both MPU Port Out signals 610 and 902 are low during the power off condition regardless of the speed mode.

During the power off condition, reset signal 102 goes low and transistor 104 turns off, allowing the discharge from capacitor 106 to generate a voltage at the gate of FET 110. With the voltage at its gate, FET 110 switches on allowing transistors 118, 120, and 122 to switch on and off freely depending on the emitter-base currents from terminals 142, 144, and 146.

The method for controlling transistor 124 is the same as the one presented in FIG. 6 for controlling transistors 126 and 128. The reset signal 102 controls a transistor 900 which grounds the gate of FET 108 during the power on condition. During the power off condition, transistor 900 turns off, allowing a buildup of voltage at the gate of FET 108. A MPU Out signal 902 charges a capacitor 904 that discharges during the power off condition to generate a voltage that turns on FET 108 and in turn allowing transistor 124 to turn on.

If the MPU Out signal 902 is low during the power on condition, capacitor 904 would not be charged and therefore would not discharge during the power off condition. Because there is no discharge from capacitor 904, FET 108 does not turn on, preventing transistor 124 from turning on and none of the back-emf current from terminal 142 will be supplied to the VCM 148.

Transistors 126 and 128 are controlled by another MPU Out signal 610 and operates in the same manner as in the previous embodiment.

Therefore it is clear that the different high/low combinations of the 2 MPU Out signals 610 and 902 allow the retract circuit to be in the 1-Phase, 2-Phase, or 3-Phase configurations. When both MPU Out signals 610 and 902 are high during the power on condition, all three transistors 124, 126, and 128 will be allowed to switch on and off freely during the power off condition and thus the retract circuit is in the 3-Phase configuration. When MPU Out signal 610 is high and MPU Out signal 902 is low during the power on condition, only transistors 126 and 128 are allowed to turn on and off during the power off condition, and the retract circuit is in the 2-Phase configuration. When the MPU Out signal 610 is low and the MPU Out signal 902 is high during the power on condition, only transistor 124 is allowed to switch on and off freely during the power off condition and therefore the retract circuit is in the 1-Phase configuration.

Figure 10:
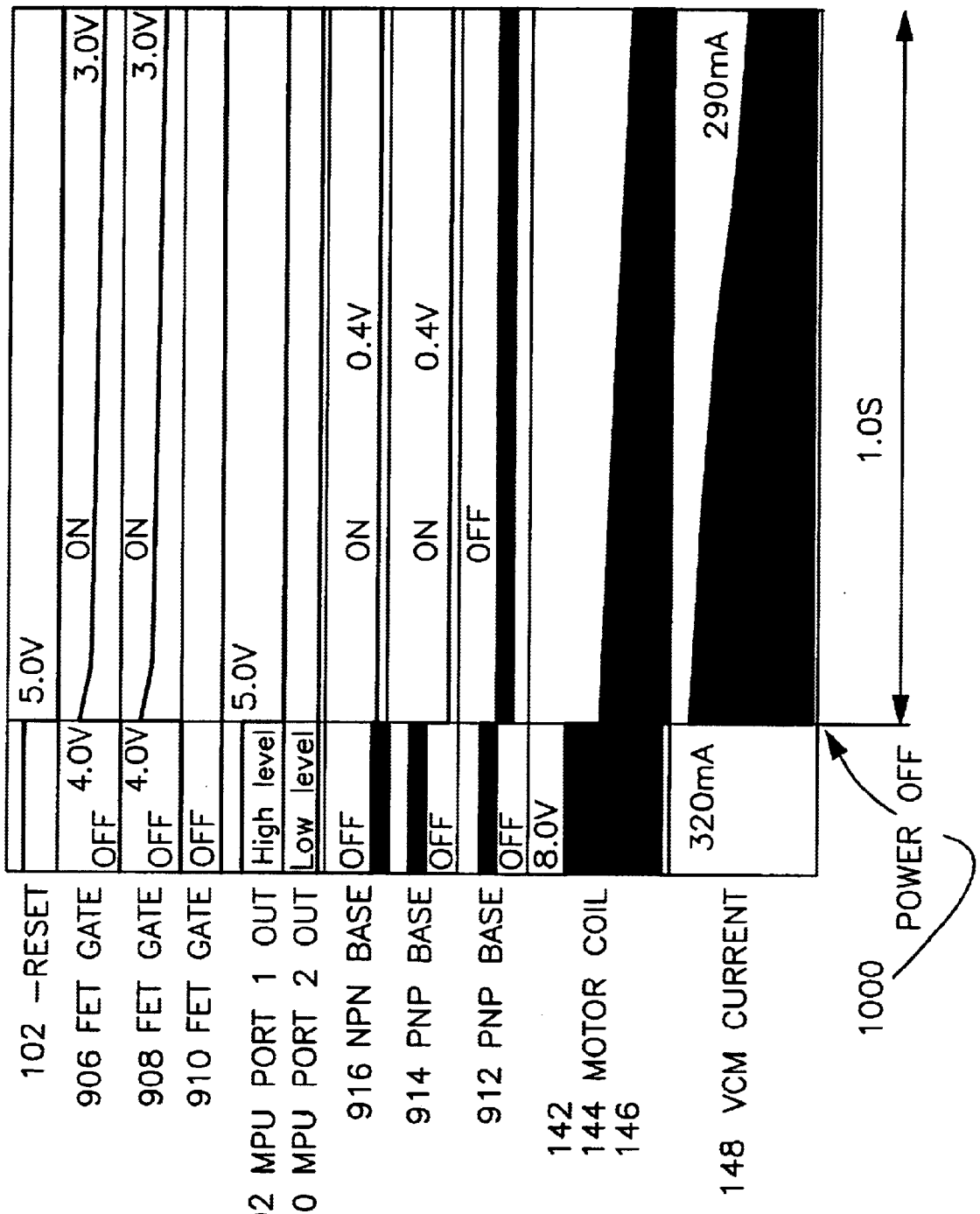
FIG. 10 is a timing diagram of the 1–2–3-phase selection embodiment of the present invention in a 1 phase high speed mode.

FIG. 10 is a timing diagram of the above embodiment of the present invention in a 1-phase high speed mode. At time 1000, the power off condition occurs. Reset signal 102 goes low. FET gate 906 stays on from the voltage supplied by the discharging capacitor 106. This allows a current to flow in the emitter-base junction of transistors 118, 120, and 122 and is illustrated by the presence of 0.4V at the NPN base 916. MPU Port Out signal 902 changes to low at this time and capacitor 904 starts to discharge, keeping FET gate 908 switched on. This allows a current to flow in the emitter-base junction of transistor 124 and is illustrated by the presence of 0.4V at the PNP base 914. MPU Port Out signal 610 was low before and after the power off condition and therefore capacitor 612 was not charged during the power on condition. Since it was not charged, capacitor 612 does not discharge during the power off condition, causing FET gate 910 to stay off. This keeps transistors 126 and 128 off and no current is allowed to flow in the emitter-base junction of these two transistors. This is illustrated by the lack of a voltage at the PNP base 912. The motor coil voltage drops as the motor spins freely to a stop. The VCM current 148 also drops as the spindle motor spins freely to a stop.

Figure 11:
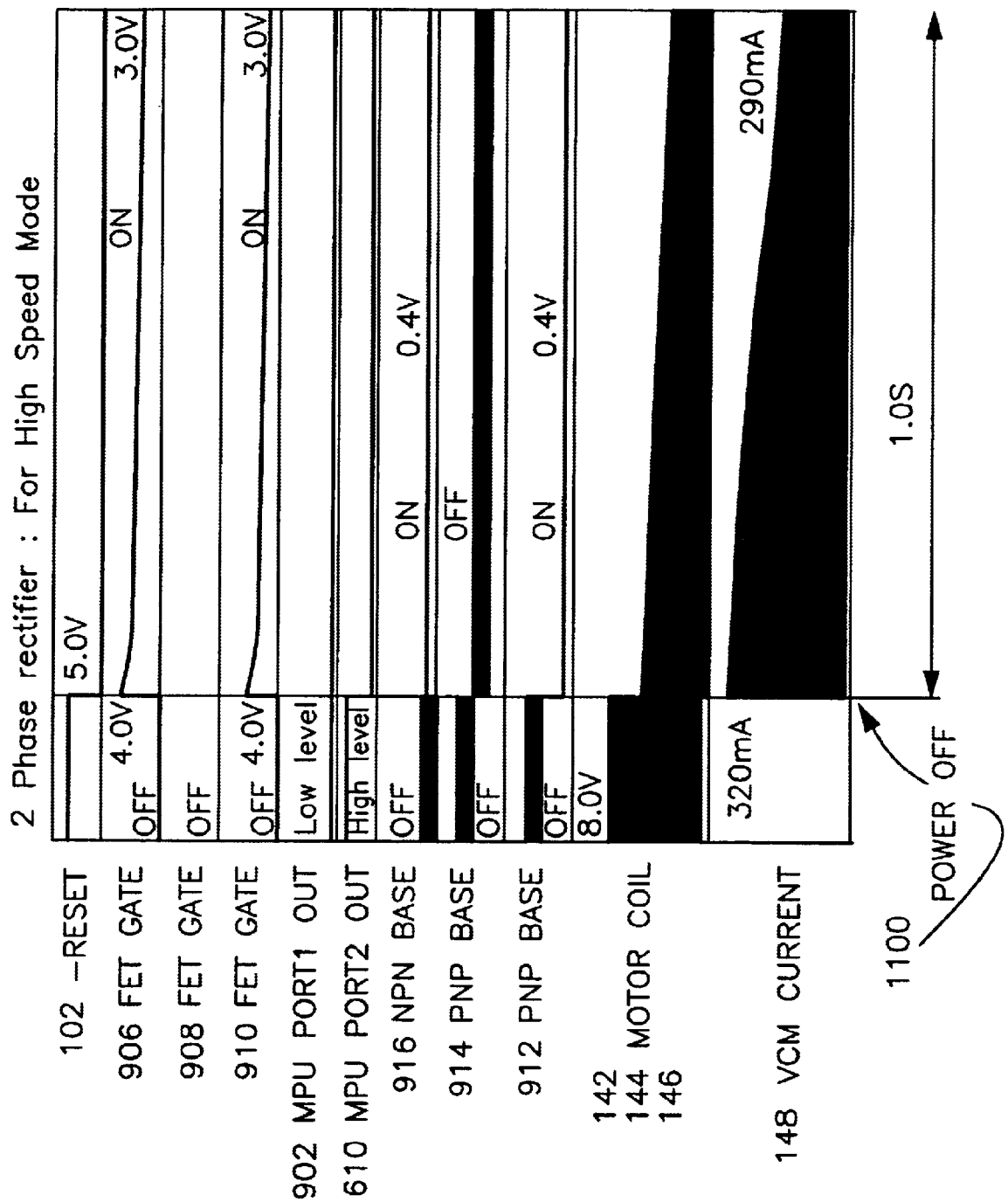
FIG. 11 is a timing diagram of the 1–2–3-phase selection embodiment of the present invention in a 2 phase high speed mode.

FIG. 11 is a timing diagram of the above embodiment of the present invention in a 2-phase high speed mode. At time 1100, the power off condition occurs. Reset signal 102 goes low. FET gate 906 stays on from the voltage supplied by the discharging capacitor 106. This allows a current to flow in the emitter-base junction of transistors 118, 120, and 122 and is illustrated by the presence of 0.4V at the NPN base 916. MPU Port Out signal 610 changes to low at this time and capacitor 612 starts to discharge, keeping FET gate 910 switched on. This allows a current to flow in the emitter-base junction of transistors 126 and 128 and is illustrated by the presence of 0.4V at the PNP base 912. MPU Port Out signal 902 was low before and after the power off condition and therefore capacitor 904 was not charged during the power on condition. Since it was not charged, capacitor 904 does not discharge during the power off condition, causing FET gate 908 to stay off. This keeps transistors 124 off and no current is allowed to flow in the emitter-base junction of this transistor. This is illustrated by the lack of a voltage at the PNP base 914. The motor coil voltage drops as the motor spins freely to a stop. The VCM current 148 also drops as the motor spins freely to a stop.

Figure 12:
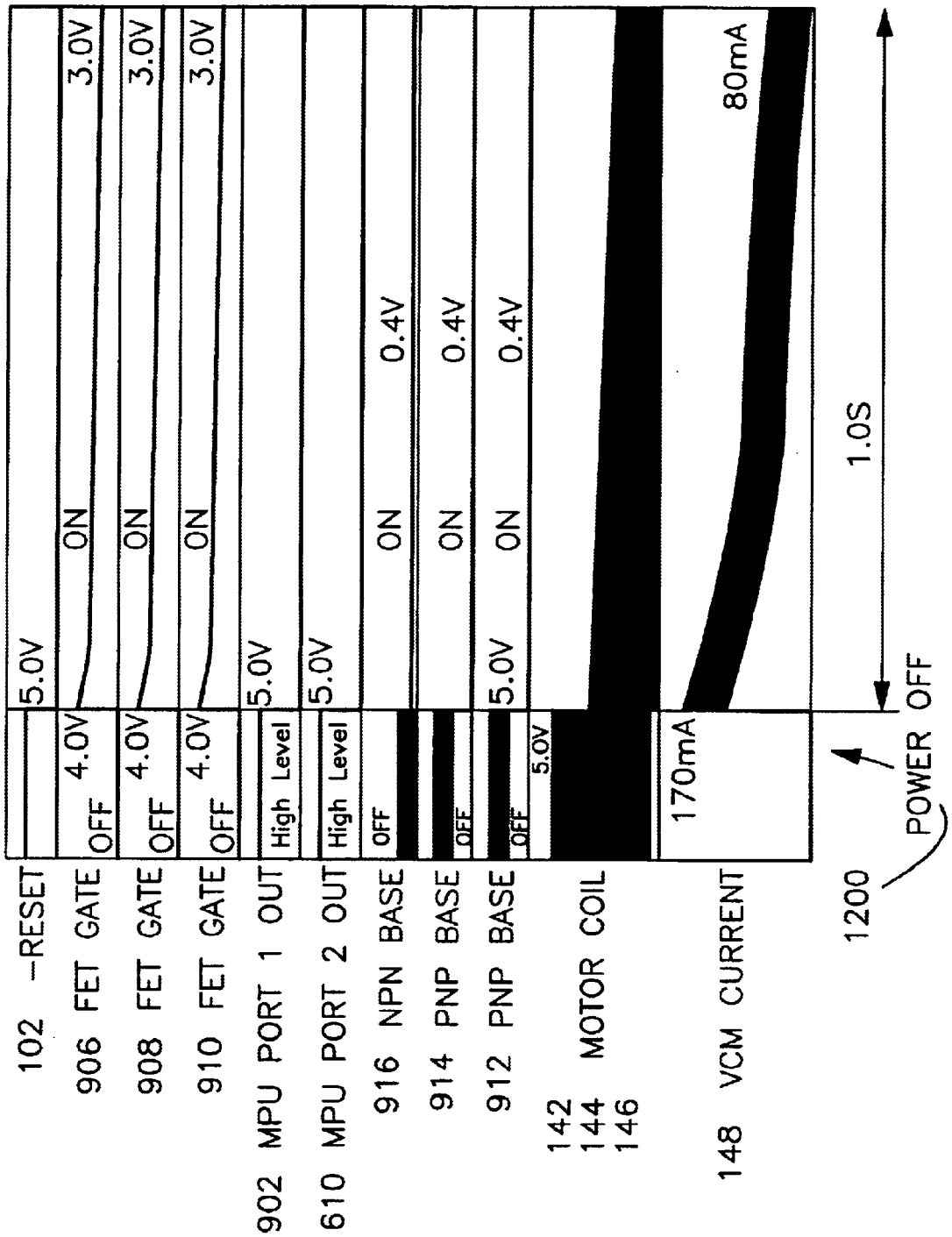
FIG. 12 is a timing diagram of the 1–2–3-phase selection embodiment of the present invention in a 3 phase low speed mode.

FIG. 12 is a timing diagram of the above embodiment of the present invention in a 3-phase low speed mode. At time 1200, the power off condition occurs. Reset signal 102 goes low. FET gate 906 stays on from the voltage supplied by the discharging capacitor 106. This allows a current to flow in the emitter-base junction of transistors 118, 120, and 122 and is illustrated by the presence of 0.4V at the NPN base 916. MPU Port Out signal 610 changes to low at this time and capacitor 612 starts to discharge, keeping FET gate 910 switched on. This allows a current to flow in the emitter-base junction of transistors 126 and 128 and is illustrated by the presence of 0.4V at the PNP base 912. MPU Port Out signal 902 changes to low at this time and capacitor 904 starts to discharge, keeping FET gate 908 switched on. This allows a current to flow in the emitter-base junction of transistor 124 and is illustrated by the presence of 0.4V at the PNP base 914. The motor coil voltage drops as the motor spins freely to a stop. The VCM current 148 also drops as the motor spins freely to a stop.

Figure 13:
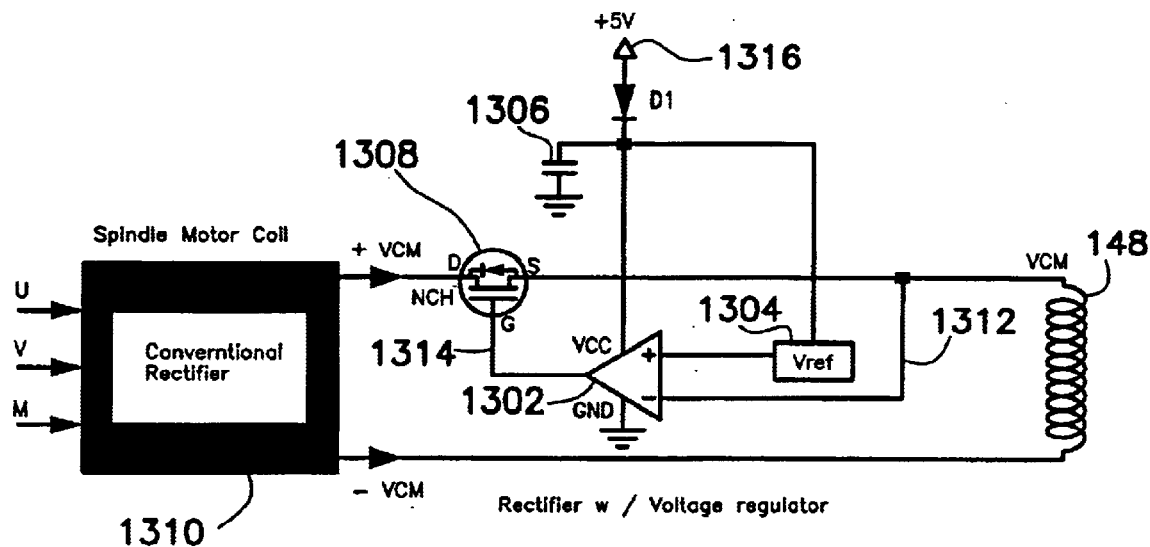
FIG. 13 is a circuit diagram illustrating a voltage regulation embodiment of the present invention.

FIG. 13 is another embodiment of the present invention. This embodiment uses a voltage regulator. An operational amplifier 1302 is used to control a field effect transistor 1308 which controls the supply of current from a conventional rectifier 1310 to the VCM 148. The operational amplifier 1302 compares the voltage 1312 which is the voltage coming from the conventional rectifier 1310 to the voltage reference 1304. When voltage 1312 is higher than the voltage reference 1304, the output voltage 1314 of the operational amplifier will be zero or negative, causing transistor 1308 to turn off and stop current from flowing to the VCM 148. If the voltage 1312 is smaller than the voltage reference 1304, the operational amplifier will have a positive output voltage 1314 and will cause transistor 1308 to turn on and allow current to flow to the VCM 148. By controlling the voltage reference 1304, the current supplied to the VCM 148 can be controlled.

During the power on condition, capacitor 1306 gets charged by supply source 1316. During the power off condition, capacitor 1308 supplies the power to operational amplifier 1302 and the voltage reference 1304.

The above description is for a voltage regulator. Although voltage and current regulation have slightly different characteristics in their effect on the actuator, both will perform satisfactorily.

Figure 14:
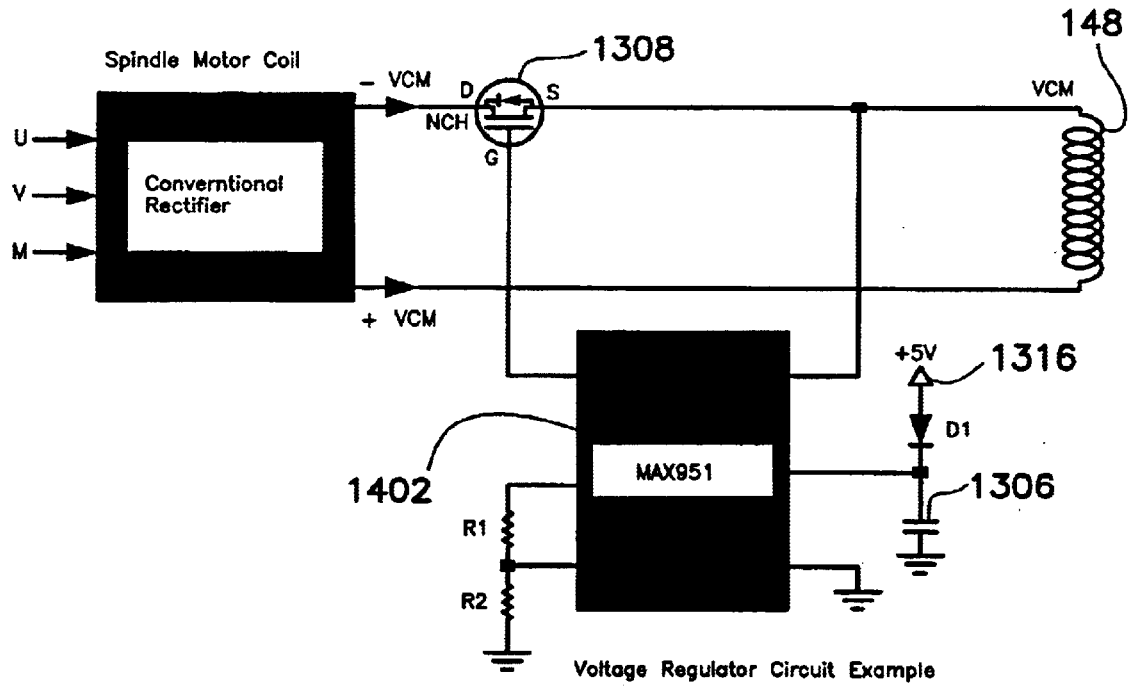
FIG. 14 is a circuit diagram illustrating a specific implementation of the voltage regulation embodiment illustrated in FIG. 13.

FIG. 14 is an actual embodiment of the above embodiment. An operational amplifier 1402 is used in conjunction with field effect transistor 1404. Operational amplifier 1402 incorporates both operational amplifier 1302 and the voltage reference 1304 in the above embodiment. Capacitor 1306 and supply source 1316 is also shown for illustration purpose.

FIG. 19 is a table listing the components used in a specific implementation of the voltage regulation embodiment of the present invention illustrated in FIG. 13.

The table below summarizes the retract currents for the specific implementations of the present invention as illustrated in FIGS. 15–18.

| Method | Low Speed Mode | Mid Speed Mode | High Speed Mode |
| --- | --- | --- | --- |
| Conventional | 170 mA | N/A | 320 mA |
| Resistance | 140 mA | N/A | 160 mA |
| Phase Selection | 160 mA | 240 mA | 160 mA |
| Voltage Regulator | 160 mA | N/A | 170 mA |

Although the preceding description of the present invention contains many specifics for a dual speed motor control circuit, anyone skill in the art will appreciate that many variations and alterations are within the scope of the invention. Accordingly, the scope of the invention should be determined by the following claims and their legal equivalents.

What is claimed is:
1. A disk drive system comprising:
 one or more data disks;
 an actuator;
 a parking ramp for receiving said actuator;
 a spindle motor for rotating one or more data disks operable in two or more different speed modes, said spindle motor having windings for two or more phases;

an actuator retract circuit electrically coupled to said actuator;

wherein said actuator retract circuit retracts said actuator to said parking ramp during a power-off condition; wherein said actuator retract circuit utilizes back-emf generated by said spindle motor to retract said actuator; wherein said actuator retract circuit retracts said actuator at approximately the same speed in all of said two or more speed modes.

2. The system as claimed in claim 1 wherein said actuator retract circuit controls an amount of current supplied to a voice coil motor which retracts said actuator, enabling said actuator retract circuit to retract said actuator at approximately the same speed in all of said two or more speed modes.

3. The system as claimed in claim 2 wherein said control of current is accomplished by altering resistance in said retract circuit.

4. The system as claimed in claim 3 wherein said retract circuit comprises:

- a transistor functioning as a switch responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;
- a first resistor connected in series with said voice coil motor;
- a second resistor connected in series with said voice coil motor and in parallel with first resistor;
- a transistor connected in series with said second resistor; wherein when said transistor turns on, back-emf current from said windings will be allowed to flow through said second resistor and into said voice coil motor;
- a signal output from a main processor unit to a gate of said transistor;
- a capacitor with one terminal coupled with said signal output and the other terminal coupled to ground; wherein said capacitor is charged by said signal output; wherein said capacitor discharges when power is removed from said spindle motor; wherein said discharge to said gate of said transistor turns on said transistor when power is removed from said spindle motor;
- a resistor with one terminal coupled with said signal output and the other terminal coupled to ground, in parallel with said capacitor.

5. The system as claimed in claim 4 wherein said capacitor is charged when said signal output is high and not charged when said signal output is low.

6. The system as claimed in claim 4 wherein said transistor functioning as a switch is a field effect transistor.

7. The system as claimed in claim 4 wherein said transistor connected to said second resistor in series is a field effect transistor.

8. The system as claimed in claim 2 wherein said control of current is accomplished by phase selection wherein only one or more selected windings supply back-emf current to said voice coil motor.

9. The system as claimed in claim 8 wherein said retract circuit comprises:

- one or more transistors functioning as switches responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;
- one or more output signals which control one or more of said transistors;
- one or more capacitors coupled with said output signals; wherein said capacitors supply voltage to one or more of said transistors during said power off condition.

10. The system as claimed in claim 9 wherein a combination of states of said output signals reflects a state of said speed mode.

11. The system as claimed in claim 10 wherein said combination of output signals turns on one or more of said transistors functioning as switches; wherein said transistors functioning as switches then turns on one or more of said bipolar transistors.

12. The system as claimed in claim 2 wherein said control of current is accomplished by a voltage regulator.

13. The system as claimed in claim 12 wherein said retract circuit comprises:

- a rectifier circuit; wherein the current output of said rectifier circuit is supplied to said voice coil motor;
- an operational amplifier for comparing a voltage output from said rectifier circuit to a voltage reference; wherein an output of said operational amplifier is dependent on said comparison of voltages.
- a transistor coupled in series with said current output of said rectifier circuit; wherein said transistor acts as a switch to prevent said current output of said rectifier circuit from flowing to said voice coil motor; wherein said transistor is controlled by said output of said operational amplifier.

14. The system as claimed in claim 13 wherein said transistor is a field effect transistor.

15. An actuator retract circuit system comprising:

- a transistor functioning as a switch responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;

a first resistor connected in series with said voice coil motor;

a second resistor connected in series with said voice coil motor and in parallel with first resistor;

a transistor connected in series with said second resistor; wherein when said transistor turns on, back-emf current from said windings will be allowed to flow through said second resistor and into said voice coil motor;

a signal output from a main processor unit to a gate of said transistor;

a capacitor with one terminal coupled with said signal output and the other terminal coupled to ground; wherein said capacitor is charged by said signal output; wherein said capacitor discharges when power is removed from said spindle motor; wherein said discharge to said gate of said transistor turns on said transistor when power is removed from said spindle motor;

a resistor with one terminal coupled with said signal output and the other terminal coupled to ground, in parallel with said capacitor.

16. The system as claimed in claim 15 wherein said capacitor is charged when said signal output is high and not charged when said signal output is low.

17. The system as claimed in claim 15 wherein said transistor functioning as a switch is a field effect transistor.

18. The system as claimed in claim 15 wherein said transistor connected to said second resistor in series is a field effect transistor.

19. A phase selection retract circuit comprising:

one or more transistors functioning as switches responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;

one or more output signals which control one or more of said transistors;

one or more capacitors coupled with said output signals; wherein said capacitors supply voltage to one or more of said transistors during said power off condition.

20. The system as claimed in claim 19 wherein a combination of states of said output signals reflects state of said speed mode.

21. The system as claimed in claim 20 wherein said combination of output signals turns on one or more of said transistors functioning as switches; wherein said transistors functioning as switches then turns on one or more of said bipolar transistors.

22. A voltage regulator actuator retract circuit comprising:

a rectifier circuit; wherein the current output of said rectifier circuit is supplied to said voice coil motor;

an operational amplifier for comparing a voltage output from said rectifier circuit to a voltage reference; wherein an output of said operational amplifier is dependent on said comparison of voltages;

a transistor coupled in series with said current output of said rectifier circuit; wherein said transistor acts as a switch to prevent said current output of said rectifier circuit from flowing to said voice coil motor; wherein said transistor is controlled by said output of said operational amplifier.

23. The system as claimed in claim 22 wherein said transistor is a field effect transistor.

24. An apparatus to retract an actuator to a parking ramp with the same actuator speed regardless of the speed of the spindle motor, said apparatus comprises:

a means to convert back-emf current from said spindle motor using a rectifier circuit and supplying said back-emf current to a voice coil motor;

a means to control the amount of said back-emf current supplied to said voice coil motor.

25. A method to retract an actuator to a parking ramp with the same actuator speed regardless of the speed of the spindle motor, the method comprising the steps of:

converting back-emf current from said spindle motor using a rectifier circuit and supplying said back-emf current to a voice coil motor;

controlling the amount of said back-emf current supplied to said voice coil motor.

26. The method as claimed in claim 25 wherein said control of current is accomplished by altering, resistance in said retract circuit.

27. The method as claimed in claim 25 wherein said control of current is accomplished by selecting phases from which said back-emf current is supplied to said voice coil motor by said retract circuit.

28. The method as claimed in claim 25 wherein said control of current is accomplished by regulating a voltage by said retract circuit.

29. A computer system comprising a hard disk drive which operates in two or more speed modes, wherein an actuator retracts with the same power regardless of the selection of said speed mode when power is removed from said hard disk drive.

30. The system as claimed in claim 29 wherein the hard disk drive comprises:

one or more data disks;

an actuator;

a parking ramp for receiving said actuator;

a spindle motor for rotating one or more data disks operable in two or more different speed modes, said spindle motor having windings for two or more phases;

an actuator retract circuit electrically coupled to said actuator;

wherein said actuator retract circuit retracts said actuator to said parking ramp during a power-off condition; wherein said actuator retract circuit utilizes back-emf generated by said multi-speed spindle motor to retract said actuator; wherein said actuator retract circuit retracts said actuator at approximately the same speed in all of said multi-speed modes.

31. The system as claimed in claim 30 wherein said actuator retract circuit controls an amount of current supplied to a voice coil motor which retracts said actuator, enabling said actuator retract circuit to retract said actuator at approximately the same speed in all of said multi-speed modes.

32. The system as claimed in claim 31 wherein said control of current is accomplished by altering resistance in said retract circuit.

33. The system as claimed in claim 32 wherein said retract circuit comprises:
- a transistor functioning as a switch responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;
- a first resistor connected in series with said voice coil motor;
- a second resistor connected in series with said voice coil motor and in parallel with first resistor;
- a transistor connected in series with said second resistor; wherein when said transistor turns on, back-emf current from said windings will be allowed to flow through said second resistor and into said voice coil motor;
- a signal output from a main processor unit to a gate of said transistor;
- a capacitor with one terminal coupled with said signal output and the other terminal coupled to ground; wherein said capacitor is charged by said signal output; wherein said capacitor discharges when power is removed from said spindle motor; wherein said discharge to said gate of said transistor turns on said transistor when power is removed from said spindle motor;
- a resistor with one terminal coupled with said signal output and the other terminal coupled to ground, in parallel with said capacitor.

34. The system as claimed in claim 33 wherein said capacitor is charged when said signal output is high and not charged when said signal output is low.

35. The system as claimed in claim 33 wherein said transistor functioning as a switch is a field effect transistor.

36. The system as claimed in claim 33 wherein said transistor connected to said second resistor in series is a field effect transistor.

37. The system as claimed in claim 31 wherein said control of current is accomplished by phase selection wherein only selected windings are allowed to supply back-emf current to said voice coil motor.

38. The system as claimed in claim 37 wherein said retract circuit comprises:
- one or more transistors functioning as switches responsive to the removal of power to the spindle motor and a plurality of paired bipolar transistors, each pair of transistors being associated with a different one of said windings, each transistor having its emitter-base junction connected in series between its associated winding and said switch and its emitter-collector junction connected in series between it associated winding and said voice motor coil; whereby in response to closing of the transistor functioning as a switch the freely rotating spindle motor generates back-emf current through successive windings to emitter-base junctions of associated transistors to successively turn on said transistors and thereby direct remaining back-emf current from said windings to said voice coil motor;
- one or more output signals which control one or more of said transistors;
- one or more capacitors coupled with said output signals; wherein said capacitors supply voltage to one or more of said transistors during said power off condition.

39. The system as claimed in claim 38 wherein a combination of states of said output signals reflects state of said speed mode.

40. The system as claimed in claim 39 wherein said combination of output signals turns on one or more of said transistors functioning as switches;
- wherein said transistors functioning as switches then turns on one or more of said bipolar transistors.

41. The system as claimed in claim 31 wherein said control of current is accomplished by a voltage regulator.

42. The system as claimed in claim 41 wherein said retract circuit comprises:
- a rectifier circuit; wherein the current output of said rectifier circuit is supplied to said voice coil motor;
- an operational amplifier for comparing a voltage output from said rectifier circuit to a voltage reference; wherein an output of said operational amplifier is dependent on said comparison of voltages;
- a transistor coupled in series with said current output of said rectifier circuit; wherein said transistor acts as a switch to prevent said current output of said rectifier circuit from flowing to said voice coil motor; wherein said transistor is controlled by said output from said operational amplifier.

43. The system as claimed in claim 42 wherein said transistor is a field effect transistor.

44. The system as claimed in claim 31 wherein said control of current is accomplished by a current regulator.

* * * * *